(12) United States Patent
Hayashi

(10) Patent No.: US 10,587,849 B2
(45) Date of Patent: Mar. 10, 2020

(54) OPTICAL SCANNING DEVICE, PROJECTION DEVICE, AND DISPLAY DEVICE

(71) Applicant: Yuki Hayashi, Osaka (JP)

(72) Inventor: Yuki Hayashi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/635,527

(22) Filed: Jun. 28, 2017

(65) Prior Publication Data

US 2018/0013992 A1     Jan. 11, 2018

(30) Foreign Application Priority Data

Jul. 6, 2016   (JP) .................... 2016-134283

(51) Int. Cl.
*G02B 27/01*     (2006.01)
*H04N 9/31*      (2006.01)
*G02B 26/10*     (2006.01)

(52) U.S. Cl.
CPC ......... *H04N 9/3129* (2013.01); *G02B 26/101* (2013.01); *G02B 27/0101* (2013.01);
(Continued)

(58) Field of Classification Search
CPC .... G02B 26/123; G02B 26/101; G02B 26/10; G02B 26/105; G02B 26/126;
(Continued)

(56) References Cited

U.S. PATENT DOCUMENTS 5,943,153 A  *  8/1999  Naiki ................ G02B 27/0031
                                              359/210.1
6,636,274 B1 * 10/2003  Mazda ............... H04N 9/3129
                                              348/657
(Continued)

FOREIGN PATENT DOCUMENTS

EP      3 232 247 A1    10/2017
JP      2013-025205     2/2013
(Continued)

OTHER PUBLICATIONS

Extended European Search Report dated Nov. 16, 2017 in European Patent Application No. 17177466.4 citing documents AA-AC, AO-AR therein 10 pages.

*Primary Examiner* — Dismery Mercedes
(74) *Attorney, Agent, or Firm* — Oblon, McClelland, Maier & Neustadt, L.L.P.

(57) ABSTRACT

An optical scanning device includes a light source, a scanning member, and an incident optical system. The scanning member two-dimensionally scans a scanning area with the deflected light beam in a first direction and a second direction perpendicular to the first direction. The incident optical system guides the emitted light beam to the scanning member, the incident optical system including the light source. The scanning area includes a first area and a second area surrounding the first area. When the scanning area is viewed from a side of the scanning member, at least a part of the incident optical system is disposed in an area of the second area that overlaps one of two divided areas of the scanning area. The two divided areas are divided by a line segment parallel to the first direction.

13 Claims, 11 Drawing Sheets

(52) U.S. Cl.
CPC ..... *G02B 27/0149* (2013.01); *G02B 27/0172* (2013.01); *H04N 9/3161* (2013.01); *H04N 9/3191* (2013.01); *G02B 2027/015* (2013.01); *G02B 2027/0161* (2013.01); *H04N 2201/0246* (2013.01); *H04N 2201/02458* (2013.01)

(58) Field of Classification Search
CPC ............ G02B 27/0031; G02B 27/0101; G02B 27/0955; G02B 27/0172; G02B 2027/014; G02B 2027/0138; G02B 21/0032; H04N 1/113; H04N 1/0283; H04N 1/195; H04N 1/19515; H04N 2201/02458; H04N 2201/0246; H04N 9/315; H04N 9/3164; H04N 9/3129
See application file for complete search history.

(56) References Cited

U.S. PATENT DOCUMENTS

| | | | | |
|---|---|---|---|---|
| 6,800,844 | B2* | 10/2004 | Kandori | G02B 26/101 |
| | | | | 250/234 |
| 8,643,923 | B2* | 2/2014 | Ishibashi | H04N 9/3129 |
| | | | | 347/246 |
| 8,810,880 | B2* | 8/2014 | Hamano | G02B 13/0005 |
| | | | | 353/69 |
| 9,997,093 | B2* | 6/2018 | Atsuumi | G02B 26/101 |
| 2003/0021497 | A1* | 1/2003 | Kandori | G02B 26/101 |
| | | | | 382/323 |
| 2006/0139718 | A1* | 6/2006 | Ishihara | G02B 26/101 |
| | | | | 359/205.1 |
| 2006/0291027 | A1* | 12/2006 | Taniguchi | G02B 26/101 |
| | | | | 348/744 |
| 2007/0171497 | A1* | 7/2007 | Ishihara | G02B 26/085 |
| | | | | 359/202.1 |
| 2008/0158331 | A1* | 7/2008 | Kato | B41J 2/473 |
| | | | | 347/259 |
| 2009/0135374 | A1* | 5/2009 | Horiuchi | G02B 3/0062 |
| | | | | 353/13 |
| 2009/0167837 | A1* | 7/2009 | Ishida | B41J 2/473 |
| | | | | 347/250 |
| 2009/0316243 | A1* | 12/2009 | Tsuida | B41J 2/471 |
| | | | | 359/202.1 |
| 2011/0128602 | A1* | 6/2011 | Hamano | G02B 13/0005 |
| | | | | 359/205.1 |
| 2013/0215487 | A1* | 8/2013 | Konuma | G02B 26/105 |
| | | | | 359/212.2 |
| 2015/0055204 | A1* | 2/2015 | Ichii | G02B 26/0841 |
| | | | | 359/214.1 |
| 2015/0293349 | A1 | 10/2015 | Matozaki et al. | |
| 2016/0041492 | A1* | 2/2016 | Tomioka | G03G 15/043 |
| | | | | 347/118 |
| 2016/0085084 | A1* | 3/2016 | Masson | G02B 5/0215 |
| | | | | 359/633 |
| 2016/0116735 | A1* | 4/2016 | Hayashi | G02B 27/0101 |
| | | | | 345/7 |
| 2016/0266384 | A1 | 9/2016 | Nakamura et al. | |
| 2017/0154406 | A1 | 6/2017 | Atsuumi et al. | |
| 2017/0269354 | A1* | 9/2017 | Suzuki | G02B 5/18 |

FOREIGN PATENT DOCUMENTS

| | | |
|---|---|---|
| JP | 2015-232692 | 12/2015 |
| JP | 2016-103575 A | 6/2016 |
| JP | 2016-136222 | 7/2016 |
| JP | 2016-170185 | 9/2016 |
| JP | 2017-067944 | 4/2017 |
| JP | 2017-097296 | 6/2017 |
| WO | WO 2013/179493 A1 | 12/2013 |
| WO | WO 2016/093066 A1 | 6/2016 |

* cited by examiner

# OPTICAL SCANNING DEVICE, PROJECTION DEVICE, AND DISPLAY DEVICE

CROSS-REFERENCE TO RELATED APPLICATIONS

This patent application is based on and claims priority pursuant to 35 U.S.C. § 119(a) to Japanese Patent Application No. 2016-134283, filed on Jul. 6, 2016 in the Japan Patent Office, the entire disclosure of which is hereby incorporated by reference herein.

BACKGROUND

Technical Field

Embodiments of the present disclosure relate to an optical scanning device, a projection device, and a display device.

Related Art

As display devices and projection devices, for example, projectors and heads-up displays (HUDs), which are mounted on mobile objects, such as vehicles, aircrafts, and ships, are known in the art. Such HUDs allow operators to visually recognize alert or information with minimum line-of-sight movement. Some HUDs include a curved screen to form an intermediate image.

The display devices and the projection devices typically increase in degree of flexibility in installation with a decrease in size. The HUDs, which are mounted on the mobile objects, are particularly desired to be downsized for an effective use in space within the mobile objects.

SUMMARY

In one aspect of this disclosure, there is provided an improved optical scanning device including a light source to emit a light beam, a scanning member, and an incident optical system. The scanning member deflects the light beam emitted from the light source to cause the deflected light beam to two-dimensionally scan a scanning area in a first direction and a second direction perpendicular to the first direction. The incident optical system guides the light beam emitted from the light source to the scanning member. The incident optical system includes the light source. The scanning area includes a first area and a second area surrounding the first area. When the scanning area is viewed from a side of the scanning member, at least a part of the incident optical system is disposed in an area of the second area that overlaps one of two divided areas of the scanning area. The two divided areas are divided by a line segment parallel to the first direction.

In another aspect of this disclosure, there is provided an improved projection device including the above-described optical scanning device to project an image formed by the scanning member scanning the first area with the light beam emitted from the light source.

In still another aspect of this disclosure, there is provided an improved display device including the above-described optical scanning device to display an image formed by the scanning member scanning the first area with the light beam emitted from the light source.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
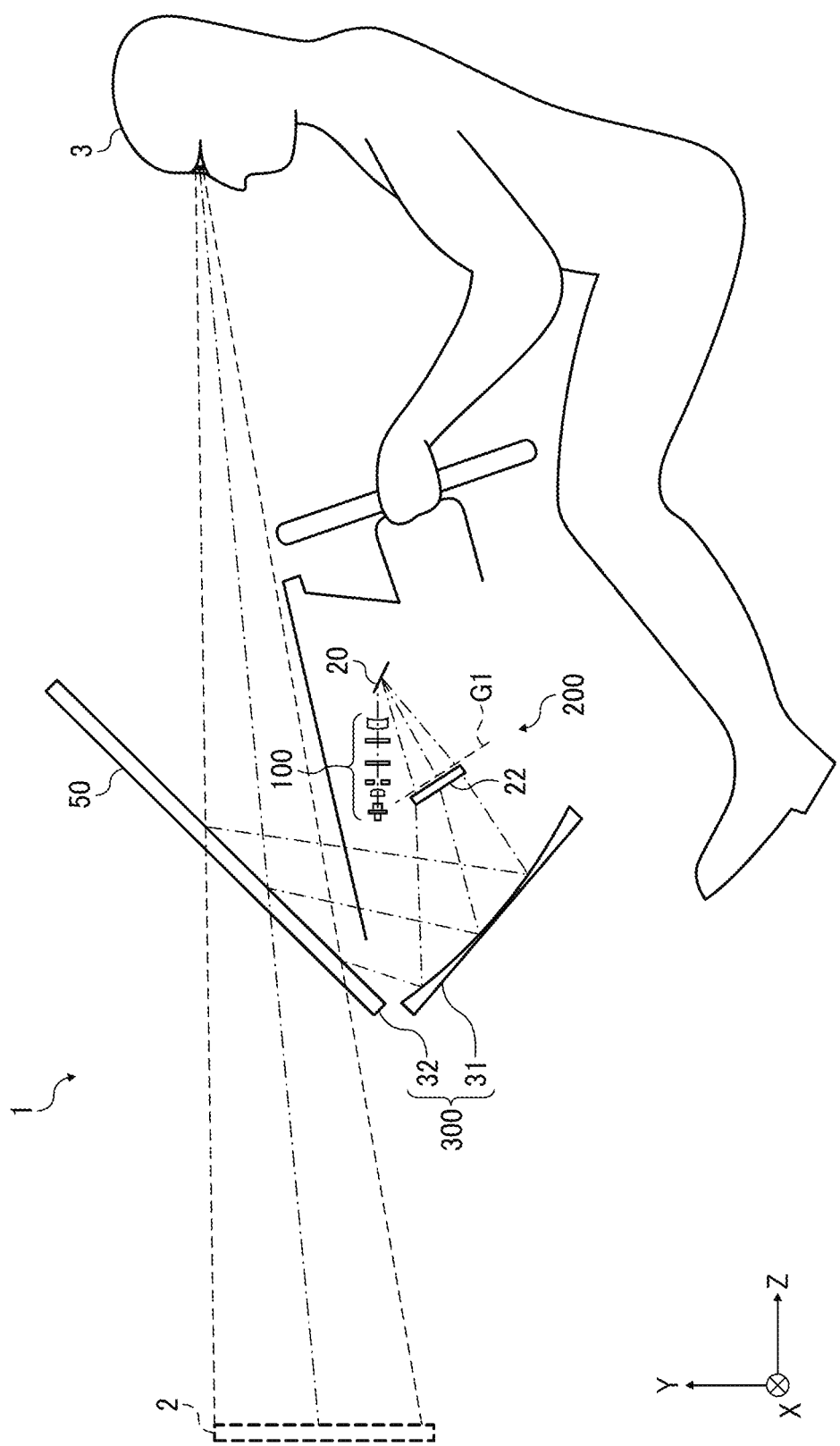
FIG. 1 is a schematic view of a display device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Display Device

A description is given below of a display device according to embodiments of the present disclosure, referring to the drawings. Firstly, a head-up display (HUD) 1 as the display device according to an embodiment of the present disclosure is described.

Outline of Display Device

As illustrated in FIG. 1, the HUD 1 is mounted on a mobile object such as a vehicle, aircraft, and ship. The HUD 1 displays information within the field-of-view of an operator of the mobile object. The "information" includes, for example, information regarding the movement of the mobile object or information regarding the operation of the mobile object. The information also includes an alert that notifies the operator of the operating state of the mobile object.

The HUD 1 forms an intermediate image in an image-forming unit 22 and projects the formed intermediate image to the field-of-view of the operator, thereby allowing the operator to visually recognize a virtual image 2 that corresponds to the intermediate image formed in the image-forming unit 22.

Configuration of Display Device

As illustrated in FIG. 1, the HUD 1 includes a light-source unit 100 as an example of an incident optical system, a scanning optical system 200 as an optical scanning device, and an observation optical system 300. In the present embodiment, cases in which the HUD 1 is installed in a vehicle are described.

Outline of Light Source Unit

The light-source unit 100 emits a light beam that forms an intermediate image that later forms a virtual image 2. When the virtual image 2 is to be formed as a color image, the light-source unit 100 emits a light beam that corresponds to the trichromatic colors of light for forming a color image.

Outline of Scanning Optical System

The scanning optical system 200 forms an intermediate image according to a light beam emitted from the light-source unit 100 in the image-forming unit 22.

Configuration of Observation Optical System 300

The observation optical system 300 includes a concave mirror 31 and an optical combiner 32.

The intermediate image formed by the scanning optical system 200 is magnified by the concave mirror 31 that is a reflective optical element of the observation optical system 30, and is projected onto the optical combiner 32. The intermediate image magnified and projected by the concave mirror 31 is then reflected by the optical combiner 32, which partly constitutes the observation optical system 300, toward an observer 3.

In the present embodiment, a front windshield 50, i.e., a front window is used as the optical combiner 32. Alternatively, in some embodiments, a dedicated optical combiner 32 may be disposed within the field-of-view of the observer 3.

The intermediate image reflected by the optical combiner 32 appears as a virtual image 2 at a position different (in a direction away from the observer 3) from the physical position of the optical combiner 32. As described above, the information represented by the virtual image 2 and recognized by the observer 3 is, for example, the information regarding the driving of a vehicle, more specifically, the speed and running distance of the vehicle, and navigation information such as the destination.

The front windshield 50 used as the optical combiner 32, onto which the intermediate image is projected, is not typically plane. The light beam forming the projected intermediate image is thus projected onto a non-flat surface.

Accordingly, the virtual image 2 appears (is displayed) in a distorted form that corresponds to the shape of the front windshield 50. To correct such a distortion, a single concave mirror 31 is improved in shape. For example, the concave mirror 31 has a reflection plane to correct the optical distortion in which the horizon of the intermediate image is distorted convexly upward or downward. The concave mirror 31 is disposed a position to allow the reflection plane of the concave mirror 31 to correct the distortion of the virtual image 2.

The concave mirror 31 and the optical combiner 32 allow the observer 3 to visually recognize the intermediate image as the virtual image 2 magnified in a wide area within the field-of-view of the observer 3. Accordingly, even if the observer 3 slightly moves his or her head, the observer 3 can visually recognize the magnified virtual image 12 with reliability.

Note that the viewpoint of the observer 3 merely indicates a reference position, i.e., a reference eye point. It is assumed that the range of the viewpoint of the observer 3 is equal to or less than the eye range of car driver (JIS D 0021).

Here, a description is given of the three-dimensional rectangular coordinate system that is used in common between the embodiments of the present disclosure. As illustrated in FIG. 1, the forward direction of movement of a mobile object, which is the viewing direction of the observer 3, is along the Z-axis. In this case, the direction from the virtual image 2 to the observer 3, i.e., the backward direction of the mobile object, is referred to as +Z direction. The viewing direction of the observer 3, i.e., the forward direction of movement of the mobile object, is −Z direction. The horizontal direction of the field-of-view of the observer 3 is the X direction. In this case, the right direction of the observer 3, i.e., the back-side direction on the surface of the paper on which FIG. 1 is drawn, is +X direction. The left direction of the observer 3, i.e., the front-side direction on the surface of the paper on which FIG. 1 is drawn, is −X direction. The vertical direction of the field-of-view of the observer 3 is the Y direction. The upward direction of the observer 3 is +Y direction. The downward direction of the observer 3 is −Y direction.

In other words, when the mobile object is, for example, a vehicle in the embodiments of the present disclosure, the width direction, the height direction, and the length direction of the vehicle are the X direction, the Y direction, and the Z direction, respectively. The left direction of the observer 3 is the −X direction, and the right direction of the observer 3 is the +X direction. The upward direction of the observer 3 is the +Y direction. The backward direction of the vehicle is the +Z direction, and the forward direction of movement of the vehicle is the −Z direction.

Configuration of Light-Source Unit

Figure 2:
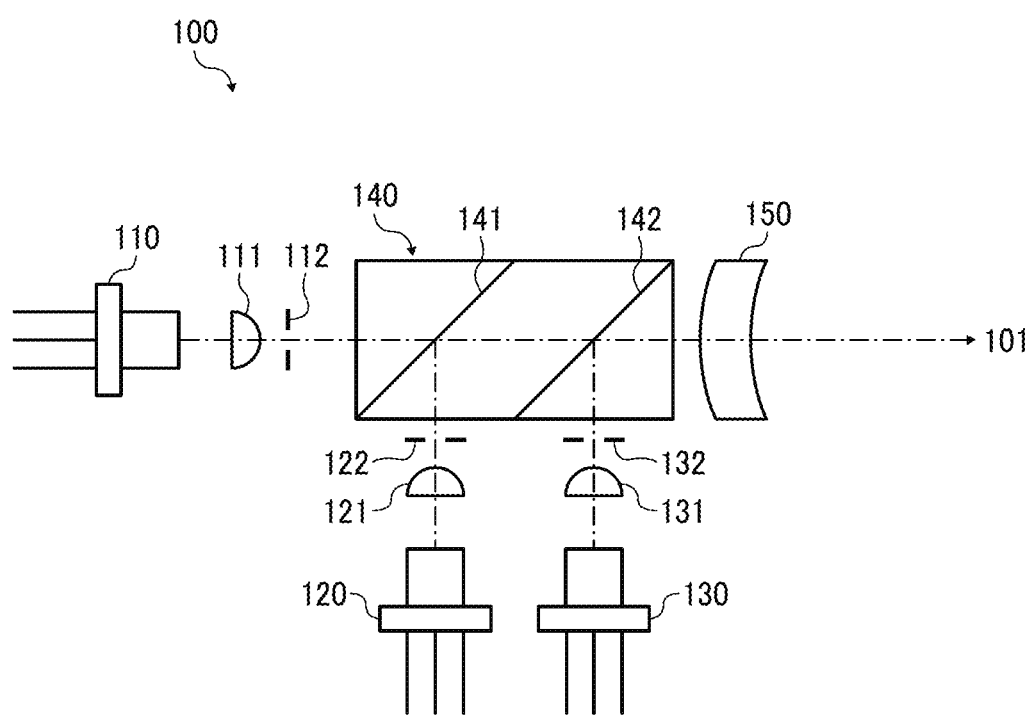
FIG. 2 is an illustration of an optical arrangement of a light-source unit mounted on the display device of FIG. 1.

Next, a description is given of an example configuration of the light-source unit 100 in detail referring to FIG. 2. The light-source unit 100 emits an image-forming beam 101 for forming a color intermediate image. The image-forming beam 101 is a light beam in which beams of three colors including red (R), green (G), and blue (B) are combined.

The light-source unit 100 includes semiconductor laser devices 110, 120, and 130 each as a light-source element (a light source) to emit a laser beam having a different color. The semiconductor laser devices 110, 120, and 130 for different colors are referred to as a first laser device 110, a second laser device 120, and a third laser device 130, respectively.

The light-source unit 100 further includes coupling lenses 111, 121, and 131 to prevent the divergence of corresponding laser beams emitted from the respective laser devices 110, 120, and 130. The coupling lenses 111, 121, and 131 that correspond to the laser beams for the respective colors are referred to as a first coupling lens 111, a second coupling lens 121, and a third coupling lens 131.

Moreover, the light-source unit 100 has apertures 112, 122, and 132 that restrict and shape the diameters of the laser beams having passed through the respective coupling lenses 111, 121, and 131. The apertures 112, 122, and 132 that correspond to the respective laser beams are referred to as a first aperture 112, a second aperture 122, and a third aperture 132.

Further, the light-source unit 100 includes a beam-combining prism 140 and a lens 150 that combine and emit the laser beams for the respective colors shaped by the apertures 112, 122, and 132.

The first laser device 110 emits a laser beam for forming a red-color image. The second laser device 120 emits a laser beam for forming a green-color image. The third laser device 130 emits a laser beam for forming a blue-color image.

The wavelength $\lambda R$ of the laser beam emitted from the first laser device 110 is, for example, 640 nanometer (nm). The wavelength $\lambda G$ of the laser beam emitted from the second laser device 120 is, for example, 530 nm. The wavelength $\lambda B$ of the laser beam emitted from the third laser device 130 is, for example, 445 nm.

The beam-combining prism 140 includes a first dichroic film 141 and a second dichroic film 142. The first dichroic film 141 transmits red laser beams and reflects green laser beams. The second dichroic film 142 transmits red and green laser beams and reflects blue laser beams.

The red laser beam emitted from the first laser device 110 passes through the first coupling lens 111 and the first aperture 112, and enters the beam-combining prism 140. The red laser beam having entered the beam-combining prism 140 passes through the first dichroic film 141 and travels in a straight line.

The green laser beam emitted from the second laser device 120 passes through the second coupling lens 121 and the second aperture 122, and enters the beam-combining prism 140. The green laser beam having entered the beam-combining prism 140 is reflected by the first dichroic film 141 and travels in the same direction as the red laser beam (i.e., towards the second dichroic film 142).

The blue laser beam emitted from the third laser device 130 passes through the third coupling lens 131 and the third aperture 132, and enters the beam-combining prism 140. The blue laser beam having entered the beam-combining prism 140 is reflected by the second dichroic film 142 and travels in the same direction as the red laser beam and the green laser beam.

Note also that the apertures 112, 122, and 132 each may have any kind of shape, such as a circle, an ellipse, a rectangle, or a square, according to the divergence angle of a corresponding laser beam.

As described above, the beam-combining prism 140 emits the red laser beam and the green laser beam, which have passed through the second dichroic film 142, and the blue laser beam reflected by the second dichroic film 142 to the outside of the beam-combining prism 140. That is, the laser beam emitted from the beam-combining prism 140 is one laser beam in which the red laser beam, the green laser beam, and the blue laser beam are combined.

The laser beam emitted from the beam-combining prism 140 is converted by the lens 150 into a laser beam having a predetermined diameter. The converted laser beam having the predetermined diameter is the above-described image-forming beam 101. Note that the lens 150 is a meniscus lens that has a concave surface toward a light deflector to be described later.

Figure 14:
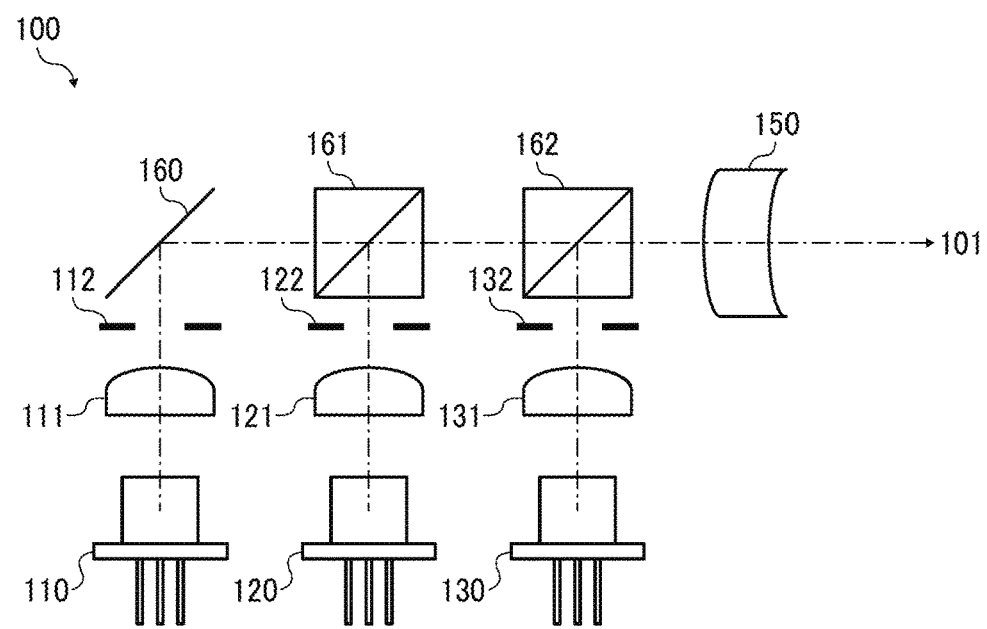
FIG. 14 is an illustration of a configuration of a light-source unit according to another embodiment in the display device according to the present disclosure.

Alternatively, in some embodiments, the light-source unit 100 may have a configuration as illustrated in FIG. 14. In the light-source unit 100 as illustrated in FIG. 14, the first laser device 110 emits a laser beam, and the emitted laser beam is reflected by a mirror 160. A beam-combining prism 161 combines the reflected laser beam with a laser beam emitted by the second laser device 120. The combined laser beam emitted from the beam-combining prism 161 is further combined with a laser beam emitted from the third laser device 130 through a beam-combining prism 162. Thus, the laser beam emitted from the beam-combining prism 162 is one laser beam in which the red laser beam, the green laser beam, and the blue laser beam are combined. In some embodiments, the first laser deice 110, the second laser device 120, and the third laser device 130 may emit the blue laser beam, the green laser beam, and the red laser beam, respectively.

The intensity of the laser beams of R (red), G (green), and B (blue) that are included in the image-forming beam 101 is modulated according to the image signal of a two-dimensional color image to be displayed or according to image data that represents the information of the two-dimensional color image. The intensity modulation of the laser beams may be performed through direct modulation in which the semiconductor laser of each color is directly modulated or through external modulation in which the laser beam emitted from the semiconductor laser of each color is modulated. In other words, the light-emission intensity of each of the semiconductor laser devices 110, 120, and 130 may be modulated by a corresponding drive unit according to the image signal of RGB components. Thus, the semiconductor laser devices 110, 120, and 130 emit laser beams for the respective colors having the modulated light-emission intensity.

In the present embodiment, cases in which a laser device is used as the light-source unit 100 are described. Alternatively, in some embodiments, light-emitting diode (LED) devices may be used instead of the laser device.

Figure 3:
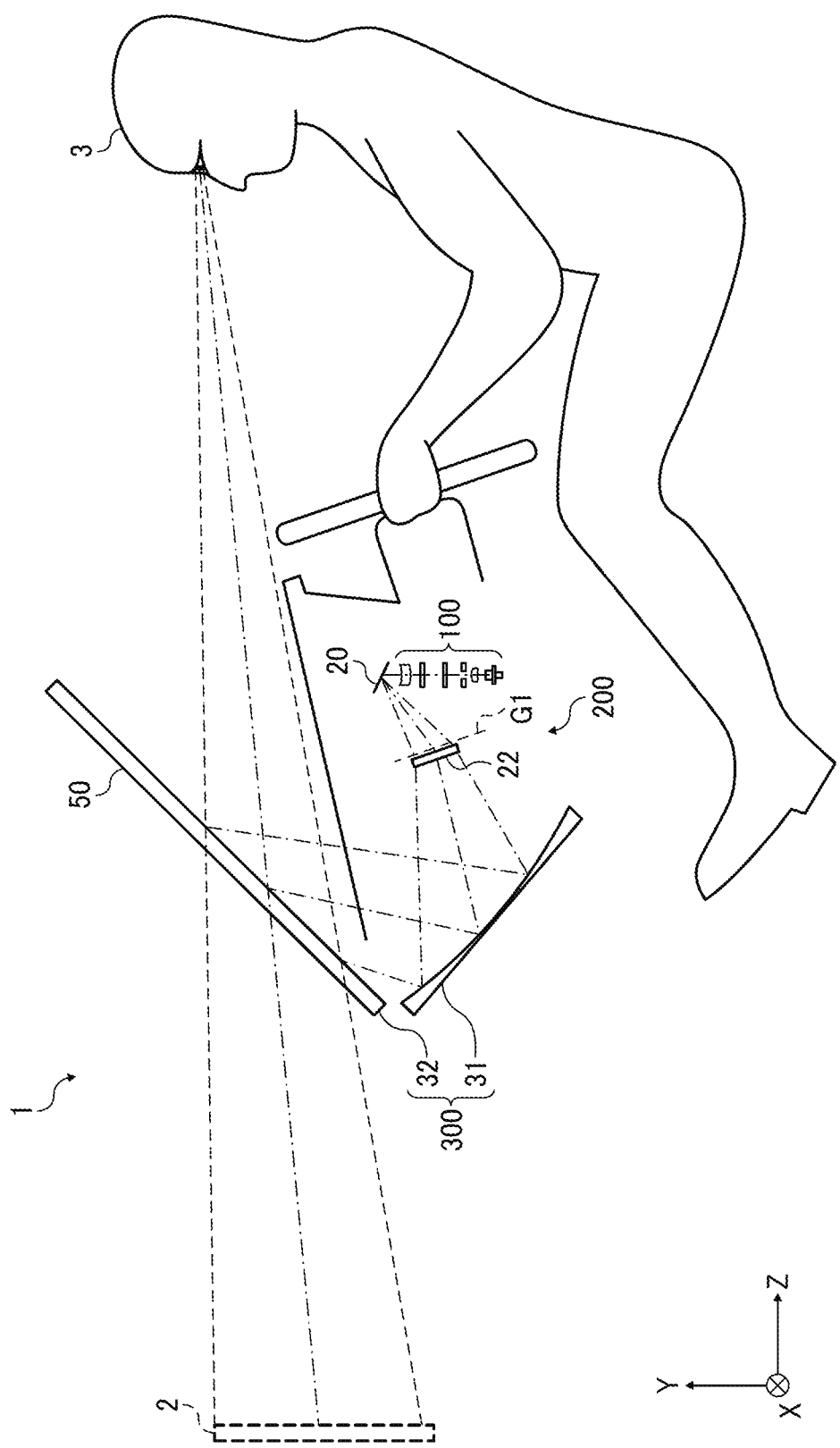
FIG. 3 is a schematic view of the display device according to another embodiment of the present disclosure.

In the present embodiment, the light-source unit 100 is disposed such that the optical axis of the light-source unit 100 is substantially parallel to the X-axis. However, no limitation is intended therein. As illustrated in FIG. 3, the optical axis of the light-source unit 100 may be substantially parallel to the Y-axis. Alternatively, in some embodiments, the optical axis of the light-source unit 100 may be disposed in a direction different from any axis. Each component of the scanning optical system 200 and the observation optical system 300 differ in installed position or angle according to the installation position of the light-source unit 100.

Configuration of Scanning Optical System

Figure 4:
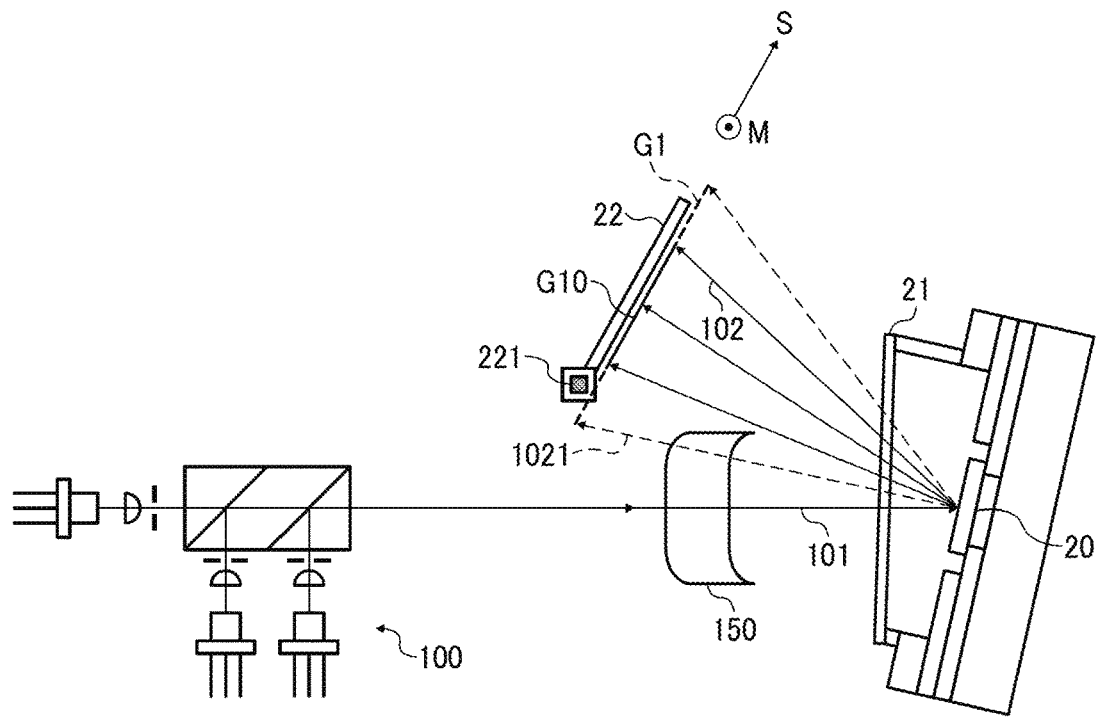
FIG. 4 is a diagram of optical paths in which a light beam emitted from the light-source unit of FIG. 2 is deflected by a light deflector of the display device in FIG. 1 for scanning to form an intermediate image in a scanning area.

As illustrated in FIG. 4, the scanning optical system 200 includes a light deflector 20 as an example of a scanning member, a cover glass 21, and the image-forming unit 22.

Outline of Light Deflector

The light deflector 20 is an image forming element that deflects the image-forming beam 101 emitted from the light-source unit 100 to two-dimensionally scans the image-forming unit 22 with the deflected image-forming beam 101. The light deflector 20 is a micro-electromechanical systems (MEMS) as a minute pivoting mirror element manufactured by any process such as the semiconductor process. The MEMS mirror two-dimensionally scans a mirror surface in a main scanning direction (a first direction) and a sub-scanning direction (a second direction) while oscillating.

The image-forming element as the light deflector 20 is not limited to the above-described example. For example, the light deflector 20 may be a digital micromirror device (DMD) manufactured by Texas Instruments that is a aggregation of micro mirrors, each micro mirror configured to oscillate using two axes perpendicular to each other. The image-forming element as the light deflector 20 may be a transmissive liquid crystal element including a transmissive liquid crystal panel or a reflective liquid crystal element as a liquid crystal device including a reflective liquid crystal panel.

The image-forming beam 101, which has been two-dimensionally deflected by the light deflector 20, passes through the cover glass 21 and enters the image-forming unit 22 as a scanning beam 102.

Then, the light deflector 20 scans the surface of the image-forming unit 22 in the main scanning direction and the sub-scanning direction with the scanning beam 102. In other words, the light deflector 20 biaxially deflects the scanning beam 102. Further, the light deflector 20 performs sinusoidal oscillation in the main scanning direction, and performs sawtooth oscillation in the sub-scanning direction, thus two-dimensionally scanning the image-forming unit 22 with the deflected laser beam.

Outline of Image-Forming Unit

The light deflector 20 two-dimensionally deflects the scanning beam 102 and scans the image-forming unit 22 with the deflected scanning beam 102, thereby forming an intermediate image. Note that, in the present embodiments, the formed intermediate image is a two-dimensional color image. In the present embodiment, cases in which the intermediate image to be formed is a color image are described. However, no limitation is intended herein. In some embodiments, a monochrome image may be formed as an intermediate image in the image-forming unit 22.

The intermediate image formed in the image-forming unit 22 at each moment of the two-dimensional deflecting and scanning with the scanning beam 102 includes only the pixels that are being irradiated by the scanning beam 102 at that time. Thus, the above-described "two-dimensional color image" is a set of pixels displayed at each moment achieved by two-dimensional scanning using the scanning beam 102.

Configuration of Image-Forming Unit

The image-forming unit 22 is a microlens array in which micro convex lenses are two-dimensionally arranged. The scanning beam 102 enters the micro convex lenses and exits the micro convex lenses through the exit surfaces thereof while diverging. In scanning the image-forming unit 22, for example, raster scanning is performed in which high-speed scanning is performed in the main scanning direction and low-speed scanning is performed in the sub-scanning direction. The diverging light beam emitted from the scanned image-forming unit 22 thus forms an intermediate image. Then, the formed intermediate image is displayed on the exit-surface side of the image-forming unit 22 (i.e., on the side of the observation optical system 300).

Figure 5:
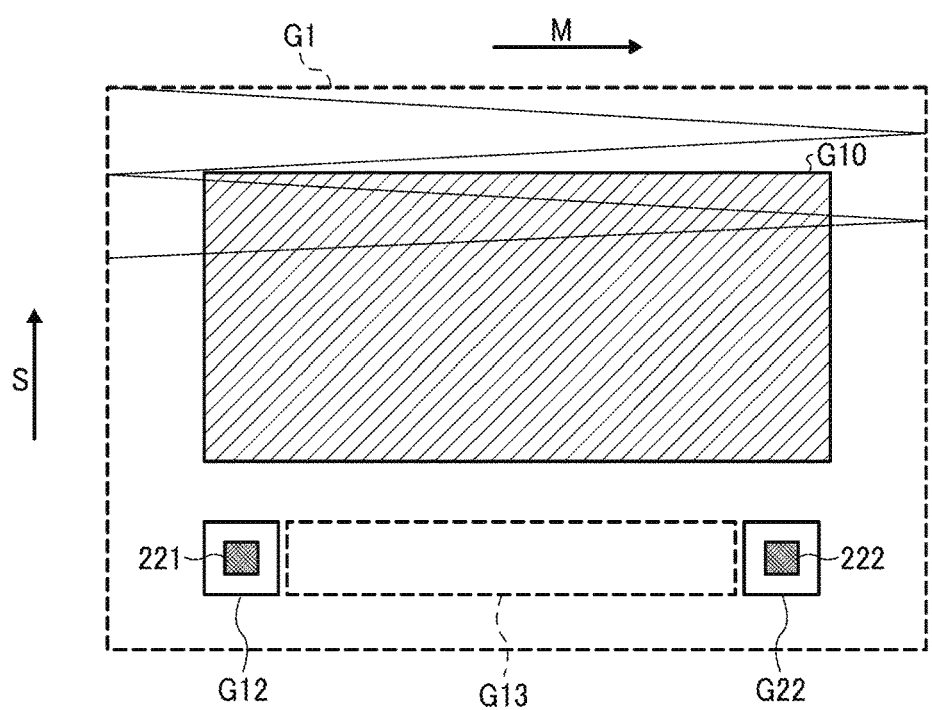
FIG. 5 is a diagram of the scanning area when viewed from a direction perpendicular to a main scanning direction and a sub-scanning direction.

As illustrated in FIG. 5, an area that is physically illuminated with the scanning beam 102 by the light deflector 20 scanning the surface of the image-forming unit 22 with the scanning beam 102 is defined as a scanning area G1.

Figure 6:
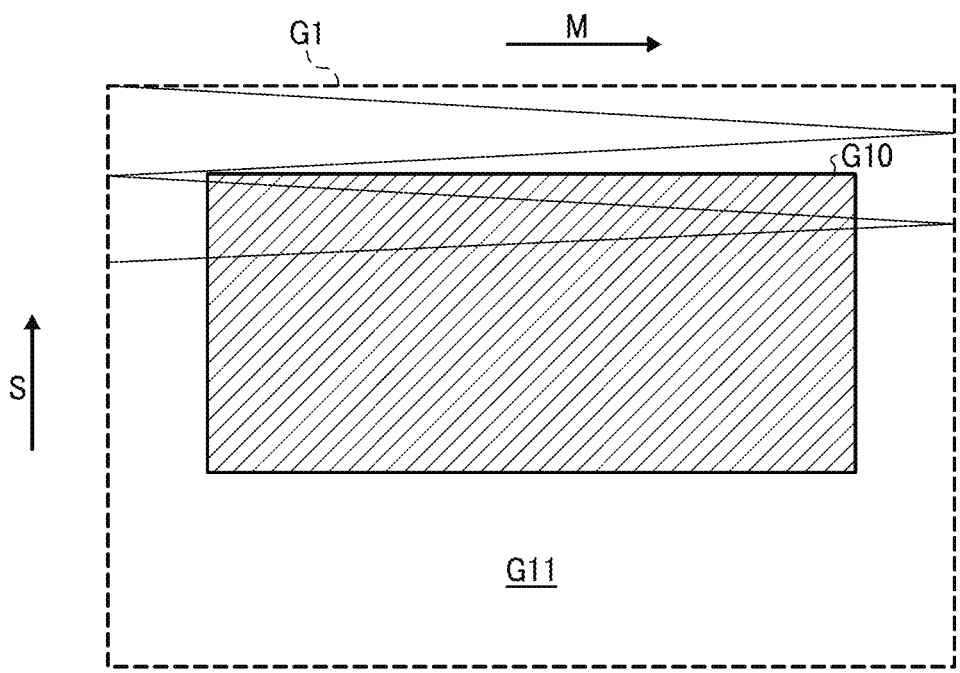
FIG. 6 is an illustration of an image-forming area and a non-image-forming area in the scanning area.

The following describes the scanning direction to two-dimensionally scan the scanning area G1 according to the present embodiment, referring to FIG. 6.

In FIG. 6, the light deflector 20 scans the scanning area G1 in a direction from bottom to top as viewed from the side of the scanning member (the light deflector 20), relative to the vertical direction of the scanning area G1. The light deflector 20 horizontally scans the scanning area G1 from the left end to the right end for each odd-numbered scanning line, relative to the horizontal direction of the scanning area G1. The light deflector 20 horizontally scans the scanning area G1 from the right end, at which an immediately preceding horizontal scanning is completed, to the left end for each even-numbered scanning line. In such a manner, the light deflector 20 performs the two-dimensional scanning. In other words, the two-dimensional scanning to form an intermediate image starts at the bottom left end and ends at the top left end in FIG. 6. In the present embodiments, the horizontal scanning direction (the main scanning direction) is an M-axis, and the vertical scanning direction (the sub-scanning direction) is an S-axis in the scanning area G1. In horizontally scanning for each odd-numbered scanning line, the direction from a side (scanning-start side), on which the scanning starts, to the other side (scanning-end side), on which the scanning ends, is a +M direction. The vertical scanning direction, i.e., the direction from the scanning-start side to the scanning-end side is a +S direction.

However, no limitation is intended thereby, and for example, a diffusing board, a transmissive screen, and a reflective screen may be adopted for the optical element that is used as the image-forming unit 22. In some embodiments, the image forming unit 22 may be a microlens array in which a plurality of micro lenses are unidimensionally arranged, or in which a plurality of micro lenses are three-dimensionally arranged.

The image-forming unit 22 may be curved to have a concave surface toward the light deflector 20. When the image-forming unit 22 has a planar shape, curvature of field occurs in intermediate images. To handle such circumstances, the image-forming unit 22 having a curved shape is used in the main scanning direction, thereby reducing or preventing the occurrence of curvature of field without any optical element having power. More specifically, the image-forming unit 22 having a curved shape can prevent a reduction in resolution and image quality of intermediate images due to the influence of any optical element having power.

As illustrated in FIG. 6, the scanning area G1 includes two areas, an image-forming area G10 (a first area) to form an intermediate image and a non-image-forming area G11 (a second area) to form no intermediate image.

In the present embodiment, the image-forming area G10 is in substantially the center of the scanning area G1, and the non-image-forming area G11 is an area surrounding the image-forming area G10 (outside the sides of the image-forming area G10). In other words, the outer frame of the non-image-forming area G11 is larger than the outer frame of the image-forming area G10.

In the image-forming area G10, the light deflector 20 scans the image-forming area G10 with the deflected scanning beam 102, thereby forming an intermediate image. At the timing at which the light deflector 20 starts scanning the image-forming area G10, i.e., the timing at which the scanning optical path reaches the image-forming area G10, the light-source unit 100 emits light based on information regarding an intermediate image to be formed and information regarding a scanning position of the light deflector 20.

In the non-image-forming area G11, any intermediate image is not formed by the light deflector 20 scanning the non-image-forming area G11 with the deflected scanning beam 102. In the present embodiment, at the timing at which the light deflector 20 starts scanning the non-image-forming area G11, i.e., the timing at which the scanning optical path reaches the non-image-forming area G11, the light-source unit 100 remains turned-off at other time other than certain timings, based on information regarding a scanning position of the light deflector 20. The "certain timings" refer to the timing for detecting the scanning timing to be described later and the timing for measuring the amount of the scanning beam 102.

Figure 7:
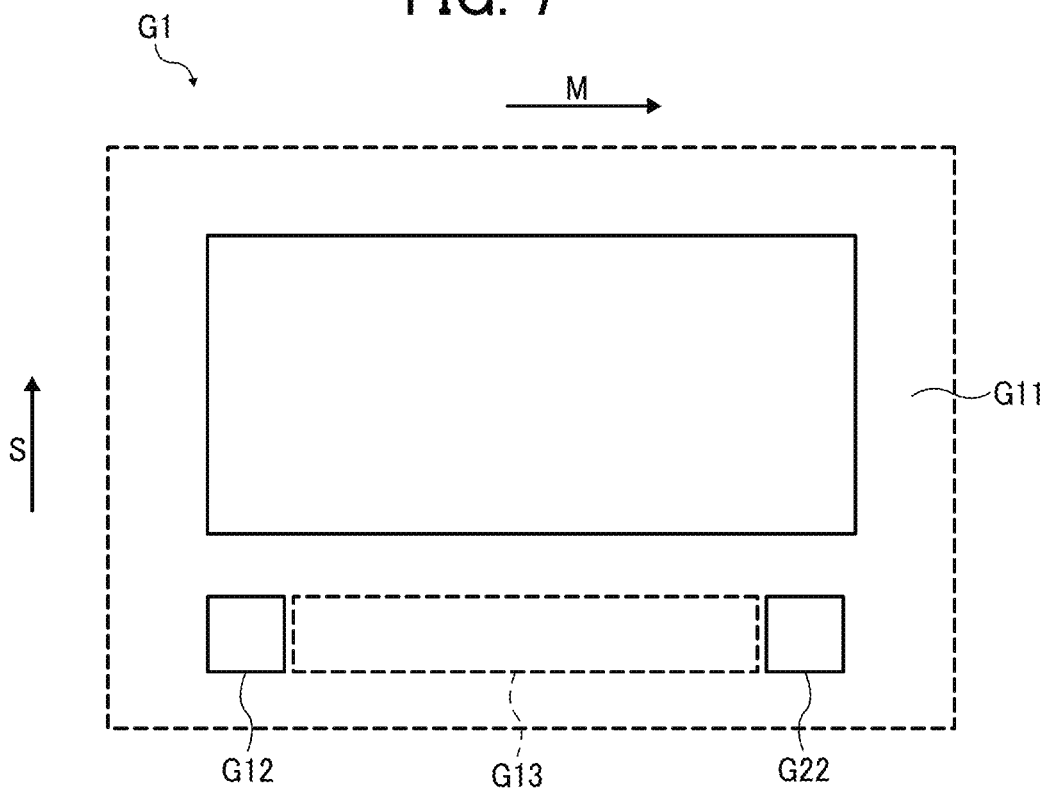
FIG. 7 is an illustration of relative positions of detection areas and a non-detection area in the non-image-forming area.

As illustrated in FIG. 7, the non-image-forming area G11 includes a detection area G12 and a detection area G22 therewithin. Between the detection area G12 and the detection area G22, a non-detection area G13 is defined in the horizontal scanning direction.

Figure 8:
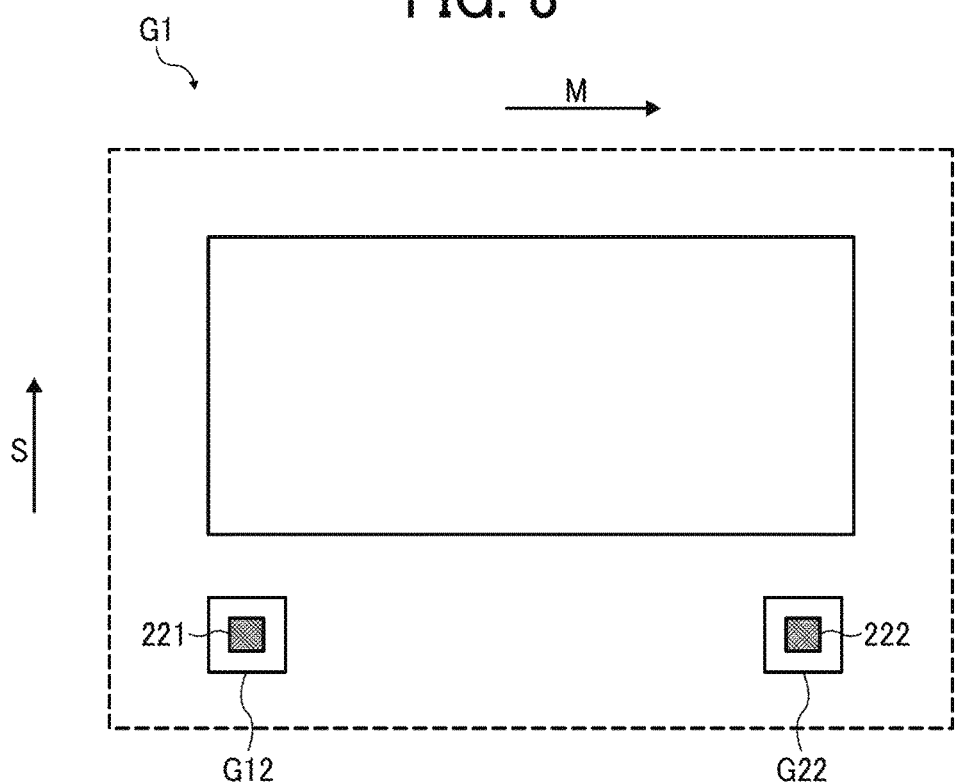
FIG. 8 is an illustration of the detection areas and detectors disposed in the detection areas, respectively.

As illustrated in FIG. 8, the detection area G12 includes a first detector 221 (as a synchronous detection sensor or simply as a sensor) to detect a reception of the scanning beam 102, detecting a synchronization of deflecting and scanning of the light deflector 20. The detection area G12 is a very small area sufficient to include the first detector 221.

The detection area G22 includes a second detector 222 to detect a reception of the scanning beam 102. Same as the detection area G12, the detection area G22 is a very small area sufficient to include the second detector 222. The first detector 221 and the second detector 222 are, for example, photodiodes.

In the present embodiment, the detection areas G12 and G22 are disposed in an area preceding the image-forming area G10 to be scanned in the vertical scanning direction, and are disposed in the vicinity of ends of the image-forming area G10 in the horizontal scanning direction, respectively. To obtain enough space for the detection areas G12 and G22 to be disposed, the area preceding the image-forming area G10 to be scanned in the vertical scanning direction is larger than another area following the scanned image-forming area G10, in the non-image forming area G11.

Such an arrangement of the first detector 221 and the second detector 222 allows detecting the timing of starting scanning to form an intermediate image as well as the timing of the horizontal scanning for an intermediate image to be formed, thereby appropriately adjusting the scanning timing, thus forming a successful intermediate image.

Figure 9:
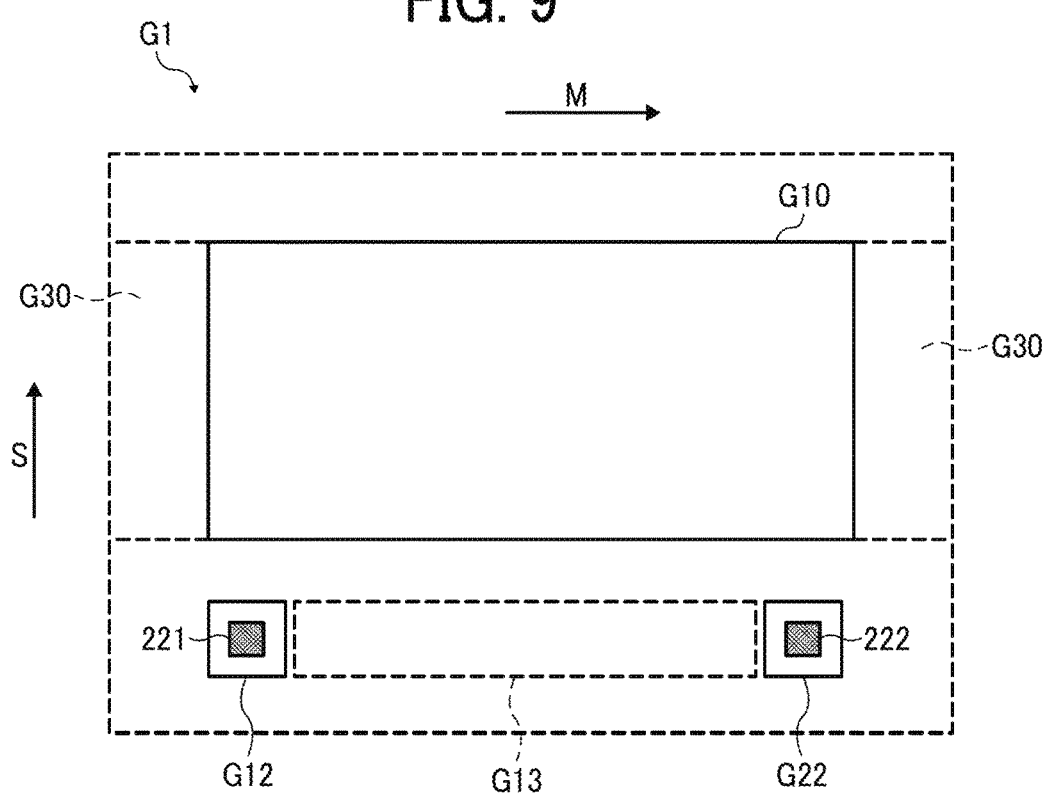
FIG. 9 is an illustration of light-intensity measurement areas in the non-image-forming area.

As illustrated in FIG. 9 according to the present embodiment, the image-forming area G10 includes a light-intensity measurement area G30 on each side of the image-forming area G10, in the non-image-forming area G11. The light-intensity measurement area G30 measures the light intensity of the scanning beam 102 to illuminate the image-forming area G10. More specifically, when the light deflector 20 scans the light-intensity measurement area G30, some light rays of the image-forming beam 101 are dispersed by a half mirror to be caused to enter a measurement system, so that the measurement system measures the intensity of the some light rays of the image-forming beam 101. The remaining light rays of the image-forming beam 101 enter the light deflector 20, and the remaining light rays having entered the light deflector 20 are used for the light deflector 20 to scan the scanning area G1. Then, the remaining light rays reach the light-intensity measurement area G30, thus having no adverse effects on an intermediate image to be formed.

The above-described configuration of the non-image-forming area G11 is effective in forming successful intermediate images. The scanning beam 102 does not enter other area other than the detection area G12 in the non-image-forming area G11, e.g., the non-detection area G13 between the detection area G12 and the detection area G22 in the main scanning direction in the non-image-forming area G11, or the light-intensity measurement area G30. Thus, the light-source unit 100 is turned off when the light deflector 20 scans other area other than the detection area G12 as described above. For such a reason, any component may be disposed in the scanning optical path ranging from the light deflector 20 to the non-detection area G13 or the light-intensity measurement area G30.

Figure 10:
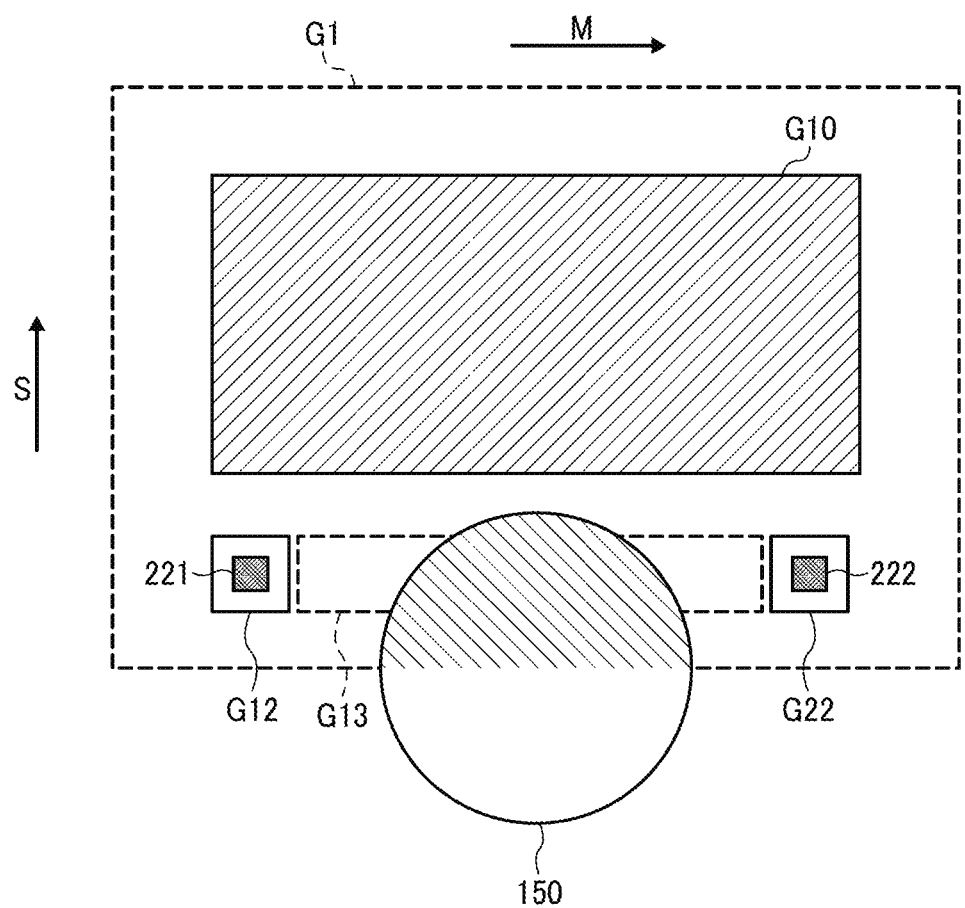
FIG. 10 is an illustration of relative positions of the scanning area and a lens of the light-source unit.

As illustrated in FIG. 4 and FIG. 10, a part of the component of the light-source unit 100 is disposed in the scanning optical path ranging from the light deflector 20 to the non-detection area G13. That is, at least a part of the light-source unit 100 is disposed in an area of the non-image forming area G11 that overlaps one of two divided areas of the scanning area G1, which is obtained by virtually divided by a line segment parallel to the main-scanning direction. For example, the light-source unit 100 is disposed such that at least a part of the light-source unit 100 overlaps the non-image-forming area G11 when the scanning area G1 is viewed from the side of the light deflector 20. More specifically, at least a part of the light-source unit 100 is disposed to overlap the non-image-forming area G11 in the field-of-view obtained when the center of the scanning area G1 is viewed from the center of the deflection surface of the light deflector 20. In the following description, the above-described filed-of-view is adopted for observation when the scanning area G1 is viewed from the side of the light deflector 20.

In the present embodiment, at least a part of the light-source unit 100 is the lens 150. The component that overlaps the non-image-forming area G11 is not limited to the lens 150, and may be any other component of the light-source unit 100, such as a holding member to hold the lens 150 or a barrel.

Figure 11A:
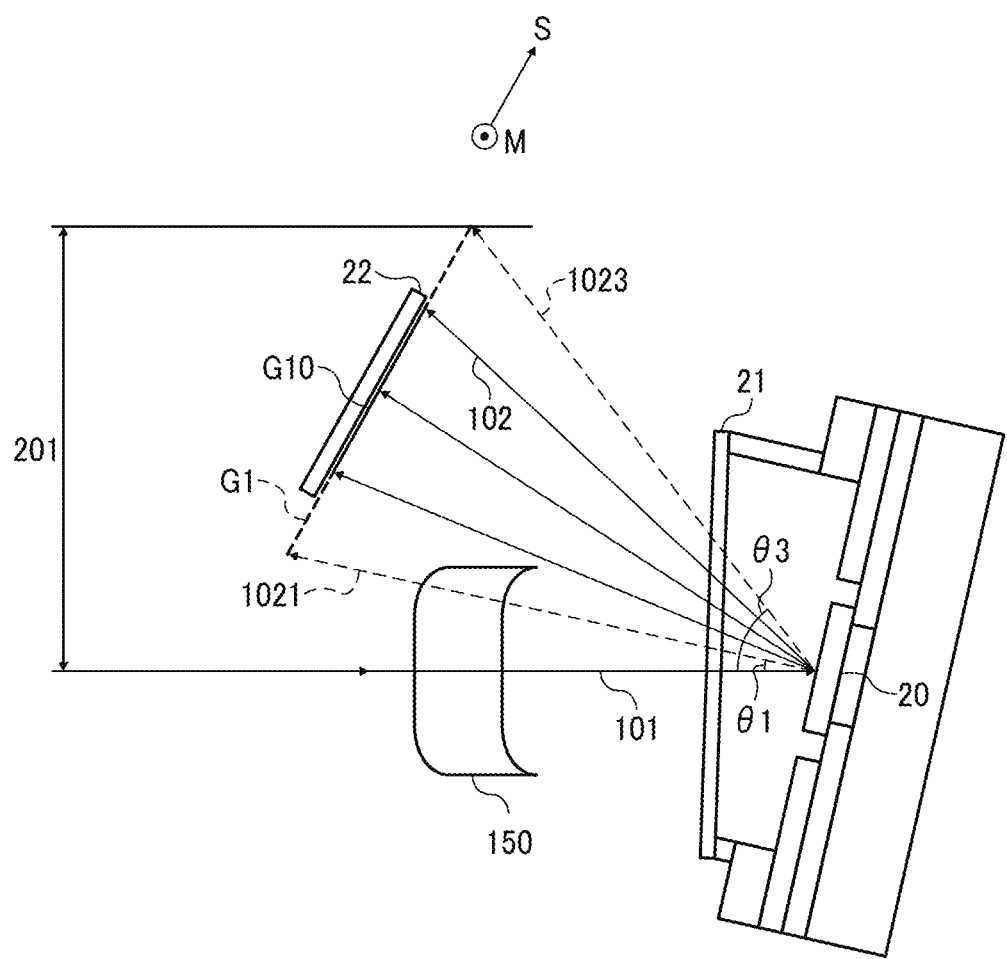
FIG. 11A is a diagram of optical paths in which a light beam enters the light deflector and travels to a scanning area in a display device according to the present discloser.
Figure 11B:
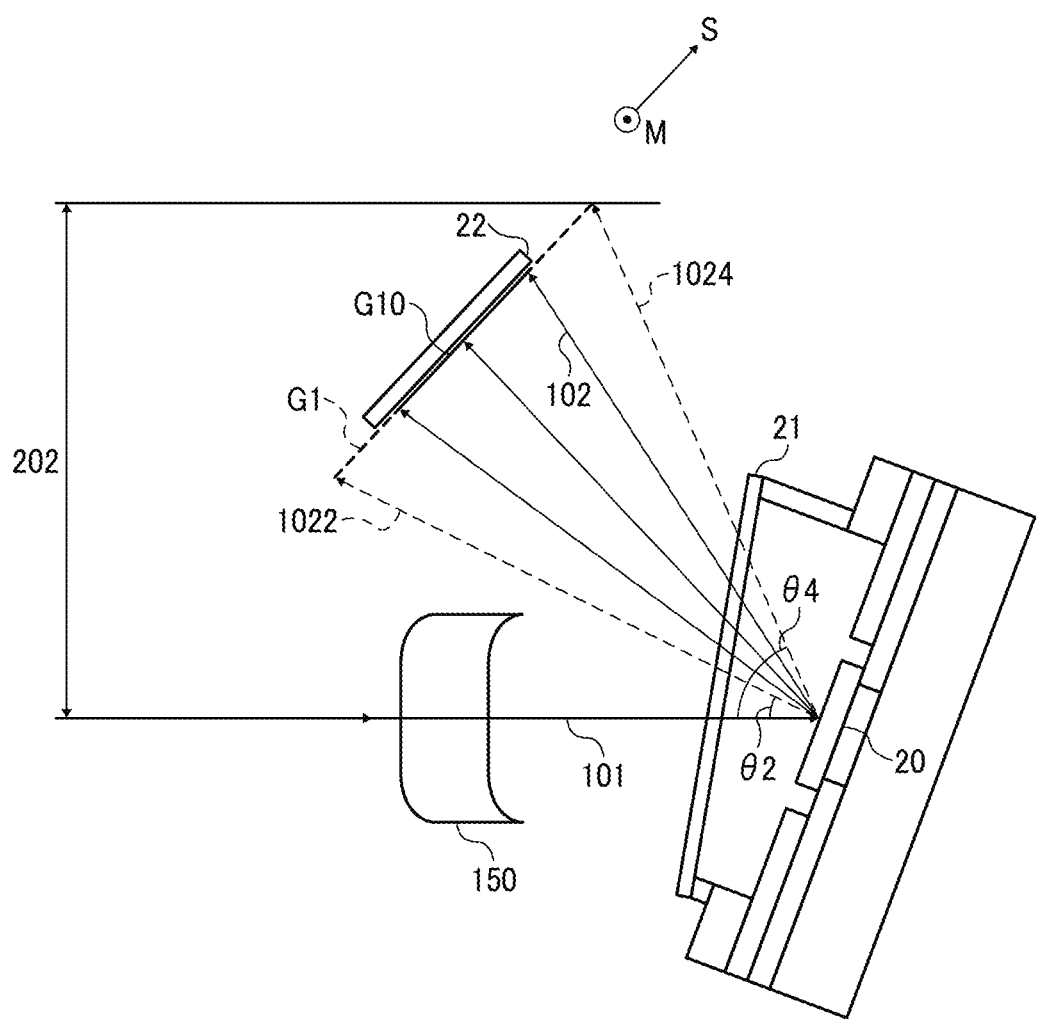
FIG. 11B is a diagram of optical paths in which a light beam enters a light deflector and travels to a scanning area in a display device according to a comparative example.

Referring to FIG. 11A and FIG. 11B, a description is given of the advantageous effects of the above-described configuration. FIG. 11A is an illustration of optical paths in the display device according to the present embodiment. FIG. 11B is an illustration of optical paths in a display device according to a comparative example. The scanning area G1 is common between FIG. 11A and FIG. 11B.

FIG. 11A and FIG. 11B represent a scanning optical path 1021 and a scanning optical path 1022, respectively. Each of the scanning optical path 1021 and the scanning optical path 1022 is an optical path in which a light beam having been emitted from the light-source unit 100 and entered the light deflector 20 travels to the scanning area G1 when the light deflector 20 scans the end on the −S side of the scanning area G1 with the light beam. FIG. 11A and FIG. 11B also represent a scanning optical path 1023 and a scanning optical path 1024, respectively. Each of the scanning optical path 1023 and the scanning optical path 1024 is an optical path that ranges from the light deflector 20 to the scanning area G1 when the light deflector 20 scans the end on the +S side of the scanning area G1. Note that the light-source unit 100 actually emits light according to a position (a scanning position) to be scanned by the light deflector 20 in the scanning area G1. For example, the light-source unit 100 emits light at the timing at which the scanning position of the light deflector 20 is any position to form an intermediate image or a position to scan the first detector 221 and the second detector 222. That is, the scanning optical paths 1021 through 1024 each merely represents an optical path, and does not illustrate actual light rays entering the light deflector 20 at the timing of the light deflector 20 scanning the end of the −S side or the +S side of the scanning area G1.

In the display device according to the present embodiment as illustrated in FIG. 11A, the lens 150 is disposed in the scanning optical path 1021. By contrast, in the display device according to a comparative example as illustrated in FIG. 11B, the lens 150 is disposed on the −S side of the scanning optical path 1022. The optical axis of the image-forming beam 101 before entering the light deflector 20 to travel along the scanning optical path 1021 (or 1022) forms an angle with the optical axis of the light beam, which has entered the light deflector 20 and is traveling through the scanning optical path 1021 (or 1022), i.e., the optical axis of the scanning optical path 1021 (or 1022). The angle in the display device according to the preset embodiment is smaller than the angle in the display device according to the comparative example. In other words, the deflection angle θ1 formed by the optical axis of the image-forming beam 101 and the scanning optical path 1021 in the display device according to the present embodiment is smaller than the deflection angle θ2 formed by the optical axis of the image-forming beam 101 and the scanning optical path 1022 in the display device according to the comparative example. Thus, the scanning area G1 can be close to the optical axis of the light beam emitted from the light-source unit 100 in the display device according to the present embodiment.

In the display device according to the present embodiment, the deflection angle θ3 is formed by the optical axis of the image-forming beam 101 and the scanning optical path 1023 that ranges from the light deflector 20 to the scanning area G1 when the light deflector 20 scans the end on the +S side of the scanning area G1. In the display device according to the comparative example, the deflection angle θ4 is formed by the optical axis of the image-forming beam 101 and the scanning optical path 1024 that ranges from the light deflector 20 to the scanning area G1 when the light deflector 20 scans the end on the +S side of the scanning area G1. Each of the deflection angle θ3 and the deflection angle θ4 is a maximum deflection angle of light deflected by the light deflector 20 in the sub-scanning direction. In this case, the deflection angle θ3 is smaller than the deflection angle θ4. Thus, the configuration of the display device according to the present embodiment allows a reduction in maximum deflection angle in the sub-scanning direction of the light deflector 20.

In the configuration according to the present embodiment, the scanning area G1 can be close to the optical axis of the light beam emitted from the light-source unit 100, thus allowing a reduction in the deflection angle θ3 of the light deflector 20 in scanning the end on the +S side of the scanning area G1 in the S direction (the vertical scanning direction). In other words, the distance 201 between (the optical axis of) the image-forming beam 101 and the upper end of the scanning area G1 in the display device according to the present embodiment is less than the distance 202 between the (the optical axis of) the image-forming beam 101 and the upper end of the scanning area G1 in the display device according to the comparative example. This configuration allows downsizing the display device and the projection device.

With a reduction in size of the HUD 1 as the device, such as the display device and the projection device, to be mounted in a mobile object, space within a vehicle (mobile object) can be effectively used. As illustrated in FIG. 3, the image-forming beam 101 is parallel to the height direction (+Y direction) of the mobile object, and the cross section of the image-forming unit 22 is inclined relative to a plane (YZ plane) defined by the Y direction and the Z direction. In this case, the Z-directional length of the HUD 1 is reduced. Such a reduction in Z-directional length of the HUD 1 can increase the space around the feet of the observer 3 in the vehicle (mobile object), which is advantageous in disposing the HUD 1 near the feet of the observer 3.

The arrangement of each optical system of the HUD 1 in the mobile object is not limited to the above description. The position to define the distance 201 differs according to the positions of the optical systems in the XYZ coordinate system of the mobile object. The HUD 1 downsizes in a direction that corresponds to the distance 201 in the XYZ coordinate system.

In the present embodiment, the light deflector 20 includes a cover glass 21 in the front to prevent dust. In the present disclosure, the cover glass 21 may be reduced in size to reduce the range in which the light beam deflected by the light deflector 20 passes through.

When the scanning area G1 is viewed from the side of the light deflector 20, the lens 150 is disposed to be closer to the center of the non-image-forming area G11 than the first detector 221 in the horizontal scanning direction, outside the image-forming area G10 in the vertical scanning direction in the non-image-forming area G11. The scanning beam 102 does not have to enter such an area in the non-image-forming area G11, and thus the light-source unit 100 is turned off when the light deflector 20 scans the area. Hence, disposing the lens 150 in the scanning optical path that ranges from the light deflector 20 to the area allows the downsizing the device such as the display device and the projection device.

When the scanning area G1 is viewed from the side of the light deflector 20, the lens 150 is disposed between the detection area G12 and the detection area G22 in the horizontal scanning direction, outside the image-forming area G10 in the vertical scanning direction of the non-image-forming area G11. The scanning beam 102 does not have to enter such an area between the detection area G12 and the detection area G22 in the non-image-forming area G11, and thus the light-source unit 100 is turned off when the light deflector 20 scans the area, as described above. Hence, disposing the lens 150 in the scanning optical path that ranges from the light deflector 20 to the area between the detection area G12 and the detection area G22 allows downsizing the device, such as display device and the projection device.

As a specific operation of the light-source unit 100, the light-source unit 100 is turned off for a certain period upon a reception of the scanning beam 102 at the first detector 221. In other words, the light-source unit 100 is turned off while the light deflector 20 scans the lens 150. With such a configuration, the scanning beam 102 does not illuminate the lens 150, thereby preventing the occurrence of ghost light due to the lens 150 disposed in the scanning optical path.

Figure 12:
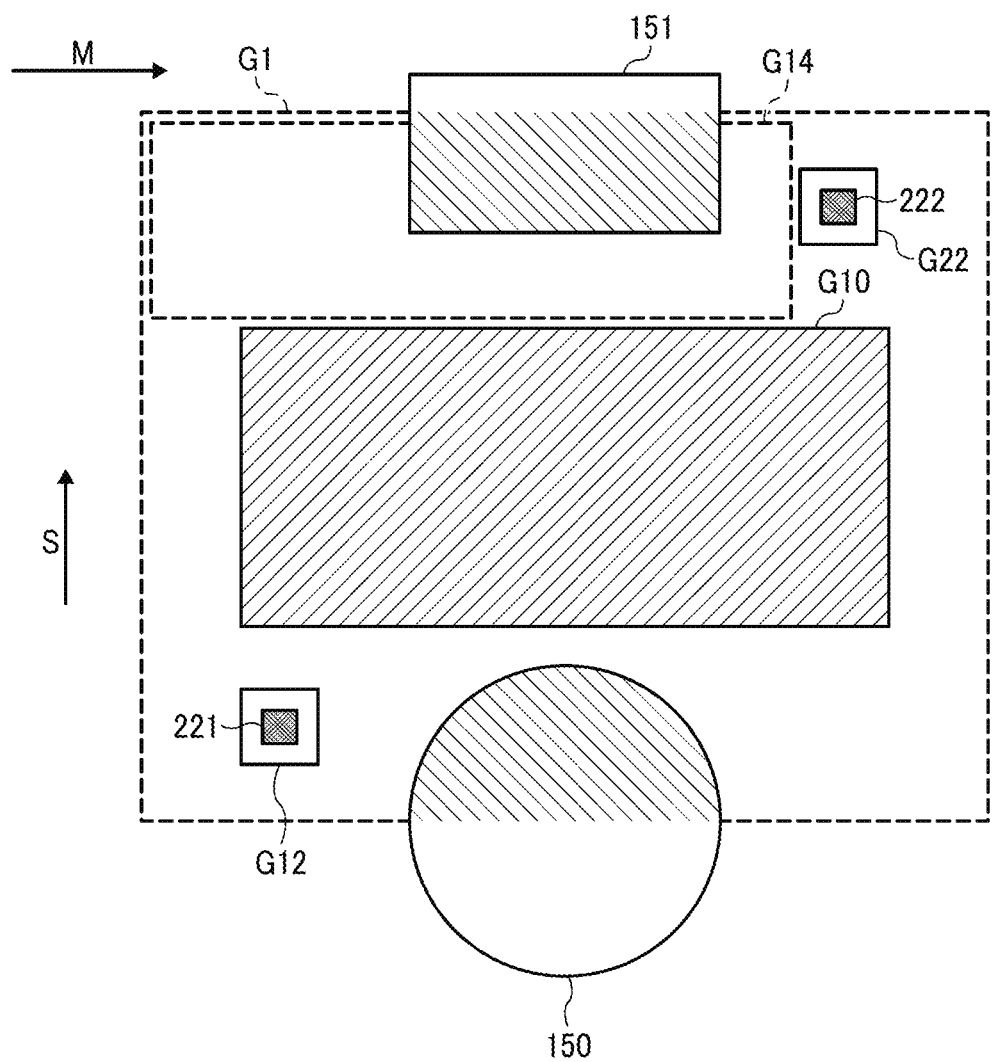
FIG. 12 is an illustration of a scanning area according to another embodiment in the display device according to the present disclosure.

As illustrated in FIG. 12, a component 151 may be disposed in the scanning optical path that leads to the area G14 on the +S side of the image-forming area G10 in the S direction. In other words, the component 151 may overlap the area G14 when the scanning area G1 is viewed from the side of the light deflector 20. In FIG. 12, the component 151 is other component other than the lens 150.

In the present embodiment, the detection area G12 is disposed in the end of the −S side of the image-forming area G10 in the S direction and in the end of the −M side of the image-forming area G10 in the M direction. The detection area G22 is disposed in the end of the +S side of the image-forming area G10 in the S direction and in the end of the +M side of the image-forming area G10 in the M direction. The components the component 151 is disposed side-by-side with the second detector 222 in a direction parallel to the horizontal scanning direction when the scanning area G1 is viewed from the side of the light deflector

20. The area G14, which is disposed side-by-side with the second detector 222 in a direction parallel to the horizontal scanning direction, is not used for the synchronous detection. Accordingly, any component may be disposed in an area, i.e., the area G14, on the upper side of the image-forming area G10 in the vertical scanning direction.

Figure 13:
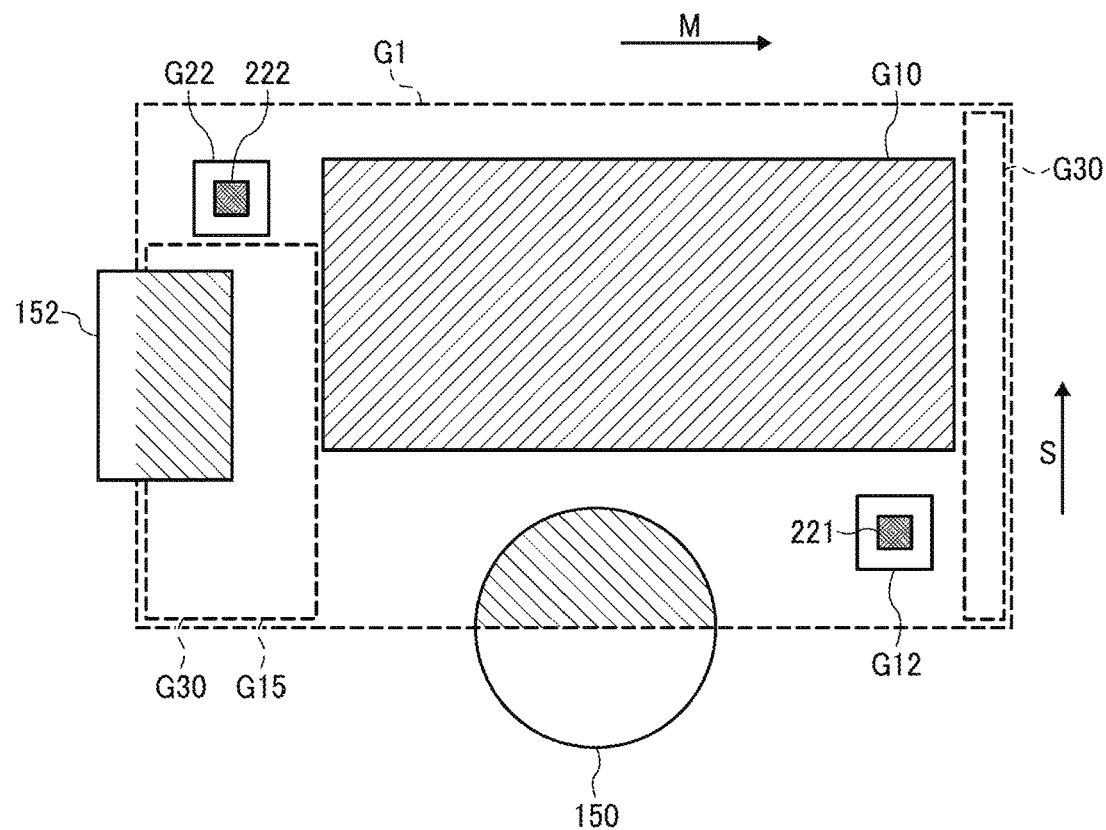
FIG. 13 is an illustration of a scanning area according to still another embodiment in the display device according to the present disclosure.

As illustrated in FIG. 13, a component 152 is disposed in an area G15 that is one of the light-intensity measurement areas G30, each of which is disposed on a side of the image-forming area G10, when the scanning area G1 is viewed from the side of the light deflector 20. In FIG. 13, the detection area G12 is disposed on the −S side of the image-forming area G10 in the S direction and on the +M side of the image-forming area G10 in the M direction. The detection area G22 is disposed in the end of the +S side of the image-forming area G10 in the S direction and in the end of the −M side of the image-forming area G10 in the M direction. Further, the component 152 is disposed in the scanning optical path that leads to the light-intensity measurement area G30 on the left side of the image-forming area G10 as viewed from the side of the light deflector 20. Although the component 152 is other component other than the lens 150, the lens 150 may be disposed in the same scanning optical path as that of the component 152.

Any component to be disposed in the vicinity of the image-forming unit 22 is disposed in the scanning optical path, in which the component 152 is disposed, as appropriate, the distance 201 as illustrated in FIG. 11A can be reduced. The above-described configuration can downsize the device such as display device and the projection device.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An optical scanning device comprising:
    a light source to emit a light beam;
    a scanning member to deflect the light beam emitted from the light source to cause the deflected light beam to two-dimensionally scan a scanning area in a first direction and a second direction perpendicular to the first direction; and
    an incident optical system to guide the light beam emitted from the light source to the scanning member, the incident optical system including the light source and an optical element,
    wherein the scanning area includes a first area and a second area surrounding the first area, the first area being an image-forming area in which an intermediate image is formed and the second area being a non-image-forming area in which no intermediate image is formed,
    wherein, when the scanning area is viewed from a side of the scanning member, the scanning area is divided into two divided areas by a line segment parallel to the first direction, and at least a part of a component that constitutes the incident optical system is disposed in an area of the second area that overlaps one of two divided areas of the scanning area, and
    wherein the at least the part of the component that constitutes the incident optical system is disposed between the scanning member and the scanning area along a scanning optical path such that the light beam in the scanning optical path intersects the at least the part of the component that constitutes the incident optical system, the scanning optical path being an optical path in which the light beam deflected by the scanning member travels to the scanning area when the scanning member scans.

2. The optical scanning device according to claim 1, further comprising a sensor to detect a synchronization of deflecting and scanning of the scanning member,
    wherein the sensor is disposed in the area of the second area that overlaps one of two divided areas of the scanning area, and
    wherein the at least a part of the component is disposed side-by-side with the sensor in a direction parallel to the first direction, in the area of the second area that overlaps one of two divided areas of the scanning area when the scanning area is viewed from the side of the scanning member.

3. The optical scanning device according to claim 2,
    wherein the sensor is disposed in a vicinity of an end of the first area in the first direction, outside the first area in the second direction, in the area of the second area that overlaps one of two divided areas of the scanning area, and
    wherein the at least a part of the incident optical system is disposed closer to a center of the second area in the first direction than the sensor, outside the first area in the second direction, in the area of the second area that overlaps one of two divided areas of the scanning area.

4. The optical scanning device according to claim 3, further comprising another sensor different from the sensor,
    wherein said another sensor is disposed in a vicinity of other end other than the end of the first area in the first direction, outside the first area in the second direction, in the area of the second area that overlaps one of two divided areas of the scanning area, and
    wherein the at least a part of the incident optical system are disposed between the sensor and said another sensor in the first direction, outside the first area in the second direction, in the area of the second area that overlaps one of two divided areas of the scanning area.

5. The optical scanning device according to claim 1,
    wherein the first direction is a main scanning direction of the scanning area, and
    wherein the second direction is a sub-scanning direction of the scanning area.

6. The optical scanning device according to claim 1,
    wherein the at least a part of the component is the optical element.

7. The optical scanning device according to claim 6,
    wherein the optical element is a lens.

8. The optical scanning device according to claim 7,
    wherein the lens is a meniscus lens that has a concave surface toward the scanning member.

9. The optical scanning device according to claim 1,
    wherein the at least part of the component is a holding member to hold the optical element in the incident optical system.

10. The optical scanning device according to claim 9,
    wherein the optical element is a lens.

11. The optical scanning device according to claim 10,
    wherein the lens is a meniscus lens that has a concave surface toward the scanning member.

12. A projection device comprising the optical scanning device according to claim 1 to project an image formed by the scanning member scanning the first area with the light beam emitted from the light source.

13. A display device comprising the optical scanning device according to claim 1 to display an image formed by the scanning member scanning the first area with the light beam emitted from the light source.

* * * * *